United States Patent
Shimizu et al.

(10) Patent No.: US 11,409,345 B2
(45) Date of Patent: Aug. 9, 2022

(54) INFORMATION PROCESSING APPARATUS, INFORMATION PROCESSING METHOD, AND PROGRAM

(71) Applicant: Sony Corporation, Tokyo (JP)

(72) Inventors: Masahiro Shimizu, Tokyo (JP); Daisuke Nakayama, Tokyo (JP); Yusuke Fujimoto, Kanagawa (JP); Masahiro Watanabe, Kanagawa (JP); Tetsunori Nakayama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 240 days.

(21) Appl. No.: 15/762,703

(22) PCT Filed: Sep. 21, 2016

(86) PCT No.: PCT/JP2016/077774
§ 371 (c)(1),
(2) Date: Mar. 23, 2018

(87) PCT Pub. No.: WO2017/104205
PCT Pub. Date: Jun. 22, 2017

(65) Prior Publication Data
US 2018/0292873 A1 Oct. 11, 2018

(30) Foreign Application Priority Data
Dec. 15, 2015 (JP) .............................. JP2015-244062

(51) Int. Cl.
*G06F 1/26* (2006.01)
*H04W 88/06* (2009.01)
(Continued)

(52) U.S. Cl.
CPC ............... *G06F 1/26* (2013.01); *H04M 11/00* (2013.01); *H04N 5/23206* (2013.01);
(Continued)

(58) Field of Classification Search
CPC ............... H04W 52/0235; H04W 4/80; H04W 52/0229; H04W 52/028; H04W 8/005;
(Continued)

(56) References Cited

U.S. PATENT DOCUMENTS 8,749,701 B2 * 6/2014 Hwang .............. H04N 5/23203
348/372
8,938,497 B1 1/2015 Wang
(Continued)

FOREIGN PATENT DOCUMENTS

CN 104041067 A 9/2014
CN 104244456 A 12/2014
(Continued)

OTHER PUBLICATIONS

Chinese Office Action dated Nov. 16, 2021 for corresponding Chinese Application No. 201680071926.7.
(Continued)

*Primary Examiner* — Zahid Choudhury
(74) *Attorney, Agent, or Firm* — Michael Best & Friedrich LLP

(57) ABSTRACT

[Object] To provide an information processing apparatus, an information processing method, and a program that are capable of improving the convenience of the communication connection to an external apparatus.
[Solution] An information processing apparatus including: a control unit configured to detect an external apparatus in a wireless communication scheme, and perform control such that power ON request data is transmitted to the external apparatus in accordance with a detection result within a certain time from a detection processing start for the external apparatus, the power ON request data requesting the external apparatus to be powered on.

19 Claims, 12 Drawing Sheets

(51) Int. Cl.
  *H04Q 9/00* (2006.01)
  *H04W 84/20* (2009.01)
  *H04M 11/00* (2006.01)
  *H04N 7/18* (2006.01)
  *H04W 84/10* (2009.01)
  *H04W 8/00* (2009.01)
  *H04N 5/232* (2006.01)
  *H04N 5/247* (2006.01)
  *H04W 4/80* (2018.01)
  *H04W 76/10* (2018.01)

(52) U.S. Cl.
  CPC ......... *H04N 5/23241* (2013.01); *H04N 5/247* (2013.01); *H04N 7/18* (2013.01); *H04Q 9/00* (2013.01); *H04W 8/005* (2013.01); *H04W 84/10* (2013.01); *H04W 84/20* (2013.01); *H04W 88/06* (2013.01); *H04W 4/80* (2018.02); *H04W 76/10* (2018.02)

(58) Field of Classification Search
  CPC ..... H04W 84/10; H04W 84/20; H04W 88/06; H04W 76/10; Y02D 70/26; Y02D 70/142; Y02D 70/1262; Y02D 70/144; Y02D 70/166; G06F 1/26; H04M 11/00; H04N 5/232; H04N 5/23206; H04N 5/23241; H04N 5/247; H04N 7/18; H04Q 9/00
  See application file for complete search history.

(56) References Cited

U.S. PATENT DOCUMENTS

| | | | | |
|---|---|---|---|---|
| 9,594,443 | B2* | 3/2017 | VanBlon | G06F 3/03545 |
| 2008/0054729 | A1* | 3/2008 | Greene | H05B 45/20 |
| | | | | 307/149 |
| 2012/0316414 | A1* | 12/2012 | Greene | H02J 50/20 |
| | | | | 600/365 |
| 2014/0192692 | A1* | 7/2014 | Stark | H04W 52/0209 |
| | | | | 370/311 |
| 2014/0342670 | A1* | 11/2014 | Kang | H04L 69/14 |
| | | | | 455/41.2 |
| 2014/0354837 | A1* | 12/2014 | Okazaki | H04M 1/7253 |
| | | | | 348/211.2 |
| 2015/0049206 | A1* | 2/2015 | Eshita | H04N 5/2251 |
| | | | | 348/207.11 |
| 2015/0223047 | A1 | 8/2015 | Abraham et al. | |
| 2015/0351038 | A1 | 12/2015 | Dooley et al. | |
| 2016/0301791 | A1* | 10/2016 | Kim | H04M 1/7253 |
| 2016/0345367 | A1* | 11/2016 | Nakayama | H04W 76/10 |
| 2017/0060185 | A1* | 3/2017 | Conners | G06F 1/1632 |
| 2017/0064063 | A1* | 3/2017 | Watanabe | H04M 1/7253 |
| 2017/0201672 | A1* | 7/2017 | Hayashi | H04N 5/232 |
| 2017/0310896 | A1* | 10/2017 | Harada | H04N 5/23245 |
| 2018/0292873 | A1* | 10/2018 | Shimizu | H04N 5/247 |
| 2018/0310248 | A1* | 10/2018 | Nakayama | H04W 52/0235 |

FOREIGN PATENT DOCUMENTS

| | | | | |
|---|---|---|---|---|
| CN | 104469463 | A | 3/2015 | |
| EP | 2840774 | A2 | 2/2015 | |
| EP | 2906001 | A1 | 8/2015 | |
| JP | 2011-142368 | A | 7/2011 | |
| JP | 2012-142939 | A | 7/2012 | |
| JP | 2015-005889 | A | 1/2015 | |
| JP | 2015-115626 | A | 6/2015 | |
| JP | 2015-127920 | A | 7/2015 | |
| WO | WO-2010059750 | A1 * | 5/2010 | ........ H04W 52/0225 |

OTHER PUBLICATIONS

Chinese Office Action dated May 6, 2021 for corresponding Chinese Application No. 201680071926.7.

* cited by examiner

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

Products obtained by applying the communication technology to imaging apparatuses such as digital cameras have been gaining widespread use in recent years. The operation of such an imaging apparatus can be controlled via communication from an external information processing apparatus or the like.

For example, Patent Literature 1 proposes the technology of controlling the operations of a plurality of imaging apparatuses with a remote controller, and displaying an image acquired from each of the imaging apparatuses on the display of the remote controller. In addition, the remote controller described in Patent Literature 1 can also switch images without requesting any operation from a user.

CITATION LIST

Patent Literature

Patent Literature 1: JP 2015-127920A

DISCLOSURE OF INVENTION

Technical Problem

It is desired that the operation for connecting such a remote controller to an imaging apparatus impose few loads on a user, and convenient connection control is desired. Patent Literature 1 does not, however, mention anything about the communication connection between the remote controller and the imaging apparatus.

The present disclosure then proposes an information processing apparatus, an information processing method, and a program that are capable of improving the convenience of a communication connection to an external apparatus.

Solution to Problem

According to the present disclosure, there is proposed an information processing apparatus including: a control unit configured to detect an external apparatus in a wireless communication scheme, and perform control such that power ON request data is transmitted to the external apparatus in accordance with a detection result within a certain time from a detection processing start for the external apparatus, the power ON request data requesting the external apparatus to be powered on.

According to the present disclosure, there is proposed an information processing method including, by a processor: detecting an external apparatus in a wireless communication scheme, and performing control such that power ON request data is transmitted to the external apparatus in accordance with a detection result within a certain time from a detection processing start for the external apparatus, the power ON request data requesting the external apparatus to be powered on.

According to the present disclosure, there is proposed a program for causing a computer to function as: a control unit configured to detect an external apparatus in a wireless communication scheme, and perform control such that power ON request data is transmitted to the external apparatus in accordance with a detection result within a certain time from a detection processing start for the external apparatus, the power ON request data requesting the external apparatus to be powered on.

Advantageous Effects of Invention

As described above, according to the present disclosure, it is possible to improve the convenience of a communication connection to an external apparatus.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
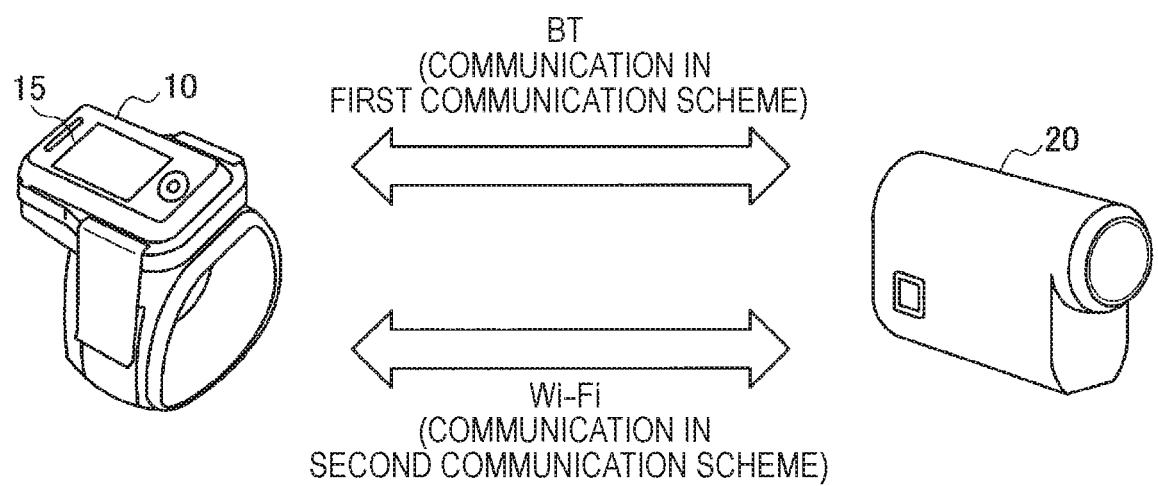
FIG. 1 is a diagram for describing an overview of an information processing apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.
1. Overview of Information Processing System according to Embodiment of the Present Disclosure
2. Configuration
2-1. Configuration of Information Processing Apparatus 10
2-2. Configuration of Imaging Apparatus 20
3. Operation Control Examples
3-1. Multi-Connections: Batch Power ON/OFF Operation
3-2. Multi-Connections: Batch Power ON/REC Operation
3-3. Multi-Connection: Information Processing Apparatus 10 Side Power OFF Operation during REC
3-4. Multi-Connections: REC Stop and Power OFF Operation
3-5. Multi-Connection: Imaging Apparatus 20 Side Power OFF Operation during Communication Connection
4. Conclusion

1. OVERVIEW OF INFORMATION PROCESSING SYSTEM ACCORDING TO EMBODIMENT OF THE PRESENT DISCLOSURE

First of all, the overview of an information processing apparatus according to the present embodiment will be described with reference to FIG. 1. An information processing apparatus 10 illustrated in FIG. 1 makes a communication connection to an imaging apparatus 20, and functions as a remote controller that controls the operation of the imaging apparatus 20. The information processing apparatus 10 also displays a through image acquired from the imaging apparatus 20 on a display unit 15 in real time to offer a so-called live view.

The information processing apparatus 10 and the imaging apparatus 20 each have a function of performing communication in different communication schemes. For example, the information processing apparatus 10 is capable of controlling communication performed in a first communication scheme and communication performed in a second communication scheme that is different from the first communication scheme. Specifically, as illustrated in FIG. 1, examples of the communication in the second communication scheme include communication compliant with the IEEE 802.11 standard (which will be represented as "Wi-Fi" (registered trademark) below). Examples of the communication in the first communication scheme include communication compliant with the IEEE 802.15 standard (which is also referred to, for example, as "Bluetooth" (registered trademark), and will be represented as "BT" below). The use of BT allows for communication with less power. In addition, the information processing apparatus 10 and the imaging apparatus 20 may also use "Bluetooth low energy" (which will be represented as "BTLE") as BT.

Wi-Fi carries the advantages that Wi-Fi is capable of communicating more data than BT is because of greater bandwidth, and that some standards accept a band of 5 GHz for communication, and thus Wi-Fi is resistant to interference in countries and regions where the 2.4 GHz band is crowded.

In addition, BTLE carries the advantages that BTLE consumes less power than Wi-Fi does, and that BTLE hops communication frequencies to perform communication, and thus BTLE is resistant to radio jamming.

Note that the plurality of different communication schemes according to the present embodiment are not limited to the two communication schemes of Wi-Fi and BT as illustrated in FIG. 1. Examples of the plurality of different communication schemes according to the present embodiment include two or more of Wi-Fi, BT, near field communication (NFC), optical wireless communication such as infrared communication, sound communication using sounds, wireless communication performed in any scheme such as Long Term Evolution (LTE), and wired communication performed in any scheme such as a local area network (LAN).

In addition, in the present embodiment, the case is assumed where operating the information processing apparatus 10 brings the imaging apparatus 20 into operation (i.e., the information processing apparatus 10 serves as a remote controller of the imaging apparatus 20). The information processing apparatus 10 transmits control information to the imaging apparatus 20 to control the operation of the imaging apparatus 20. The control information according to the present embodiment can include, for example, one or two or more of an imaging instruction, an instruction to cause the information processing apparatus 10 to transmit a through image (that is being taken by the imaging unit of the imaging apparatus 20, and is a so-called live view image), an instruction to cause the information processing apparatus 10 to transmit data indicating the settings of the imaging apparatus 20, and an instruction to change the settings of the imaging apparatus 20.

In addition, the information processing apparatus 10 may be a wearable wristband terminal including a band and a body, for example, as illustrated in FIG. 1. This allows a user to wear the information processing apparatus 10, for example, on the opposite arm to that of the dominant hand, and to operate a button and a switch on the body with the dominant hand or to check a through image in real time (live view), the through image having been acquired from the imaging apparatus 20 and being displayed on the display unit 15 on the body. Note that the information processing apparatus 10 is not limited to the wearable wristband terminal illustrated in FIG. 1, but may also be another wearable terminal (such as a wearable glasses-type terminal (eyewear) and a head-mounted display (HMD)), a smartphone, a mobile phone terminal, a tablet terminal, or the like.

Meanwhile, it is possible to control the operation of the imaging apparatus 20 by operating the information processing apparatus 10, allowing the imaging apparatus 20 to be attached within a wider application range. For example, it is possible to make the imaging apparatus 20 according to the present embodiment small, light, and strong (e.g., waterproof, dust-proof, shock-resistant, and low-temperature-resistant) such that the imaging apparatus 20 according to the present embodiment can be attached to a helmet or an instrument while a user is playing sports (such as cycling, running, snowboarding, skiing, driving, surfing, and diving), and the user is able to taken an image of a scene making the user feel realistic during the sports with his or her hands free. Since the imaging apparatus 20 applicable to sports is made small and light, and the operation device or the display device is simplified or removed. Accordingly, it is assumed that an operation on the imaging apparatus 20 such as controlling the imaging of the imaging apparatus 20 or changing the settings of the imaging apparatus 20 is performed by an external apparatus such as the information processing apparatus 10 serving as a remote controller. In addition, the housing of the imaging apparatus 20 may be configured such that the housing can be fixed by itself or by an external attachment (not illustrated) to a mobile object such as a human and a vehicle, or another object such as an information processing terminal. In addition, the imaging apparatus 20 may be configured, for example, as a wearable camera that can be worn and used on the body of a user.

A button and a switch of the imaging apparatus 20 are difficult for a user to operate at some attachment positions. It is desirable that power ON control over the imaging apparatus 20 be automatically performed, or the communication connection of the imaging device 20 to the information processing apparatus 10 be automatically made. Then, in the present embodiment, it is possible to improve the convenience of the communication connection between the information processing apparatus 10 and the imaging apparatus 20.

The above describes the overview of the information processing apparatus 10 according to the present embodiment. Next, the configurations of the information processing apparatus 10 and the imaging apparatus 20 according to the present embodiment will be described one by one with reference to FIGS. 2 and 3.

2. CONFIGURATION

<2-1. Configuration of Information Processing Apparatus 10>

Figure 2:
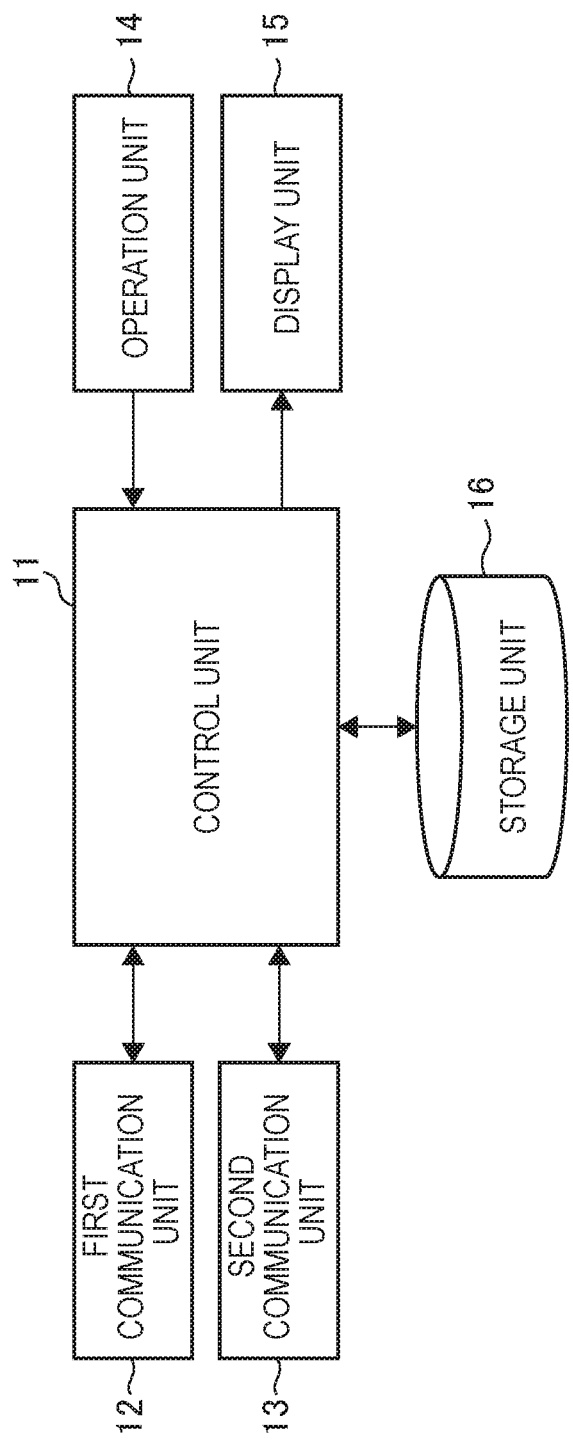
FIG. 2 is a block diagram illustrating an example of a configuration of the information processing apparatus according to the present embodiment.

FIG. 2 is a block diagram illustrating an example of the configuration of the information processing apparatus 10 according to the present embodiment. As illustrated in FIG. 2, the information processing apparatus 10 according to the present embodiment includes a control unit 11, a first communication unit 12, a second communication unit 13, an operation unit 14, a display unit 15, and a storage unit 16.

The control unit 11 functions as an operation processing apparatus and a control apparatus, and controls the overall operation of the information processing apparatus 10 in accordance with a variety of programs. The control unit 11 is implemented as an electronic circuit, for example, a central processing unit (CPU), a microprocessor, and the like. In addition, the control unit 11 may include a read only memory (ROM) that stores a program, an operation parameter and the like to be used, and a random access memory (RAM) that temporarily stores a parameter and the like varying as appropriate.

In addition, the control unit 11 according to the present embodiment detects a nearby external apparatus (imaging apparatus 20 here as an example) through the first communication unit 12 in response to a power ON operation on the information processing apparatus 10, and performs control such that power ON request data to the detected external apparatus, thereby making it possible to automatically power on the external apparatus. At this time, the control unit 11 may determine whether or not the external apparatus has been authenticated. The control unit 11 determines whether or not the external apparatus has been authenticated, for example, by a method for checking whether or not the external apparatus has been paired with the information processing apparatus 10. Specifically, the control unit 11 may determine whether the external apparatus has been paired with the information processing apparatus 10 in advance, and then transmit power ON request data from the information processing apparatus 10 to the external apparatus in the case where the external apparatus has been paired. Here, as an example, the control unit 11 determines whether or not the external apparatus has been paired with the information processing apparatus 10. However, as a determination criterion, it may be determined whether or not the external apparatus has been authenticated by a predetermined method such as determining not only whether or not pairing has been performed, but also whether or not the identifier of the apparatus is present in a connection history.

The first communication unit 12 has a function of communicating with the imaging apparatus 20 in the first communication scheme. The first communication unit 12 according to the present embodiment includes a BT communication port and a transmission and reception circuit (wireless communication) as an example. For example, the first communication unit 12 transmits power ON request data to the target imaging apparatus 20.

The second communication unit 13 has a function of communicating with the imaging apparatus 20 in the second communication scheme that is different from the first communication scheme. The second communication unit 13 according to the present embodiment includes a Wi-Fi communication port and a transmission and reception circuit (wireless communication) as an example. For example, the second communication unit 13 continuously receives through images from the imaging apparatus 20 to which a communication connection has been established, and transmits various kinds of control request data for turning recording on/off.

The operation unit 14 detects an operation input made by a user, and outputs the detected operation input to the control unit 11. Examples of the operation unit 14 include a power ON/OFF button, a recording start/stop button, a switch, a direction key, a rotary selector such as a jog dial, and the like.

The display unit 15 displays an operation screen, and a through image obtained and transmitted by the imaging apparatus 20 under the control of the control unit 11. Examples of the display unit 15 include a liquid crystal display, an organic EL display, and the like.

The storage unit 16 includes a flash memory or the like, and stores a program and a parameter for the control unit 11 to execute each function.

The above describes the configuration of the information processing apparatus 10 according to the present embodiment. Note that the configuration illustrated in FIG. 2 is an example. The configuration of the information processing apparatus 10 according to the present embodiment is not limited thereto.

<2-2. Configuration of Imaging Apparatus 20>

Figure 3:
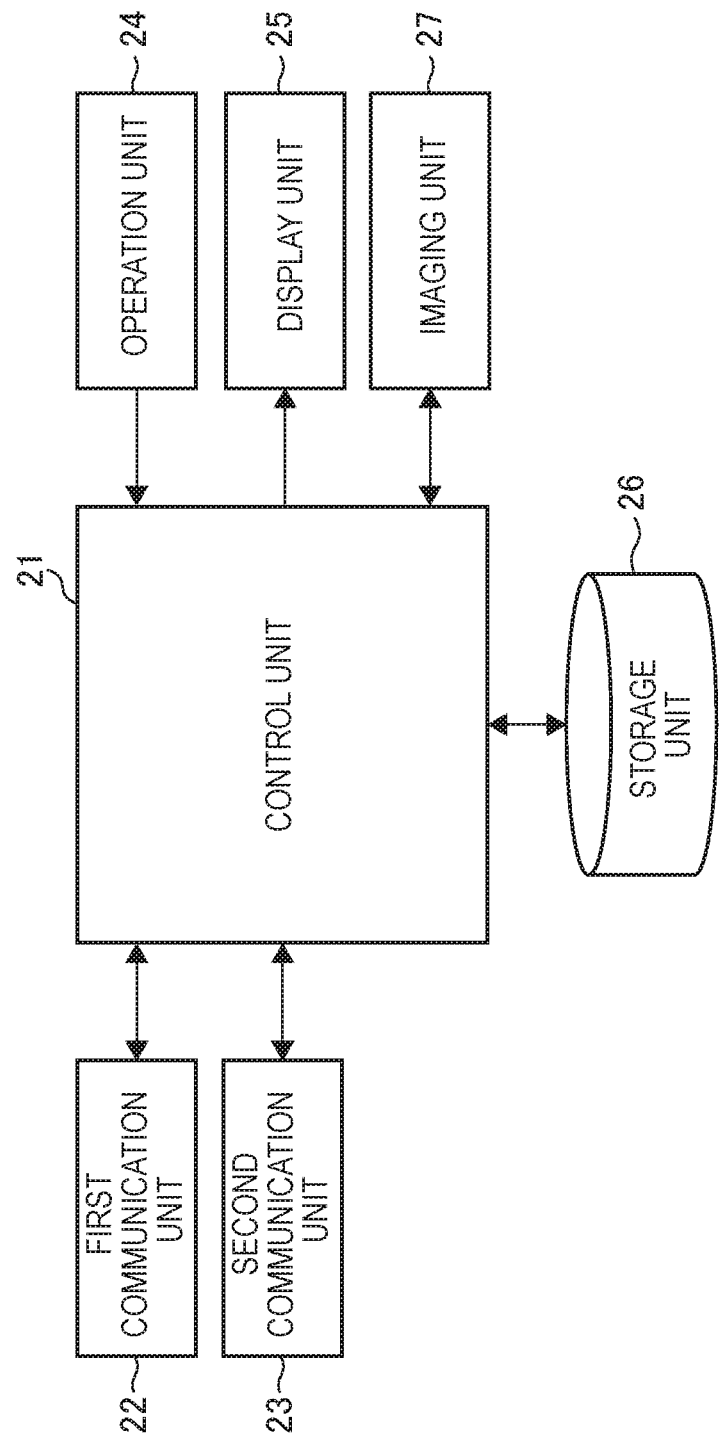
FIG. 3 is a block diagram illustrating an example of a configuration of an imaging apparatus according to the present embodiment.

Next, the configuration of the imaging apparatus 20 according to the present embodiment will be described with reference to FIG. 3. FIG. 3 is a block diagram illustrating an example of the configuration of the imaging apparatus 20 according to the present embodiment.

As illustrated in FIG. 3, the imaging apparatus 20 according to the present embodiment includes a control unit 21, a first communication unit 22, a second communication unit 23, an operation unit 24, a display unit 25, an imaging unit 27, and a storage unit 26.

The control unit 21 functions as an operation processing apparatus and a control apparatus, and controls the overall operation of the imaging apparatus 20 in accordance with a variety of programs. The control unit 21 is implemented by an electronic circuit, for example, a CPU, a microprocessor, or the like. In addition, the control unit 21 may include a ROM that stores a program, an operation parameter and the like to be used, and a RAM that temporarily stores a parameter and the like varying as appropriate.

In addition, in the case where power ON request data is received from the information processing apparatus 10 through the first communication unit 22, the control unit 21 according to the present embodiment performs control such that the imaging apparatus 20 is powered on. Here, as the power state of the imaging apparatus 20, at least the following three are considered:

Inactive state: the imaging apparatus 20 is powered off, and at least the imaging unit 27 does not perform imaging processing of capturing an image, or the first communication unit 22 and the second communication unit 23 do not either perform communication processing. However, some necessary circuits such as a clock circuit may be supplied with power.

Standby state: at least some functions are unavailable such as imaging processing performed by the imaging unit 27 to capture an image and communication processing through Wi-Fi (second communication unit 23). However, a part of the system is supplied with power, and it is possible to transmit an advertising packet, receive power ON request data, or the like through BT (first communication unit 22).

Power ON state: it is possible to use more functions such as transmitting a through image by the imaging unit 27 or through Wi-Fi than in the standby state. In addition, it is also possible to use both BT and Wi-Fi.

The first communication unit 22 has a function of communicating with the information processing apparatus 10 in the first communication scheme. The first communication unit 22 according to the present embodiment includes a BT communication port and a transmission and reception circuit (wireless communication) as an example. For example, the first communication unit 22 regularly sends advertising packets around the first communication unit 22 in the standby state. Here, the advertising packets are beacon signals that inform a nearby apparatus of the presence of the imaging apparatus 20 when the imaging apparatus 20 is in the standby state. Examples of the advertising packets include the device identifier, the name, the function, the service information, and the like of the imaging apparatus 20.

The second communication unit 23 has a function of communicating with the information processing apparatus 10 in the second communication scheme that is different from the first communication scheme. The second communication unit 23 according to the present embodiment includes a Wi-Fi communication port and a transmission and reception circuit (wireless communication) as an example. For example, in the power ON state, the second communication unit 23 continuously transmits images acquired by the imaging unit 27 as through images to the information processing apparatus 10 to which a communication connection has been established.

The operation unit 24 detects an operation input made by a user, and outputs the detected operation input to the control unit 21. Examples of the operation unit 24 include a power ON/OFF button, a recording start-stop button, a switch, and the like.

The display unit 25 displays a screen or the like indicating state information such as the power source state, the communication state, or the remaining battery of the imaging apparatus 20. Examples of the display unit 25 include a liquid crystal display, an organic EL display, and the like.

The storage unit 26 includes a flash memory or the like, and stores a program and a parameter for the control unit 21 to execute each function.

The imaging unit 27 has a function of generating an image (moving image or still image) by performing imaging. The imaging unit 27 includes, for example, a lens/imaging element and a signal processing circuit. The lens/imaging element includes, for example, an optical lens, and an image sensor including a plurality of imaging elements such as complementary metal oxide semiconductors (CMOSs). The signal processing circuit includes, for example, an AGC circuit and an ADC, and converts analog signals generated by the imaging elements into digital signals (image data). In addition, the signal processing circuit performs various kinds of processing, for example, for RAW development. Further, the signal processing circuit may perform various kinds of signal processing, for example, white balance correction processing, color correction processing, gamma correction processing, YCbCr conversion processing, edge enhancement processing, and the like.

The above specifically describes configuration of the imaging apparatus 20 according to the present embodiment. Note that the configuration illustrated in FIG. 3 is an example. The configuration of the imaging apparatus 20 according to the present embodiment is not limited thereto.

3. OPERATION CONTROL EXAMPLES

Next, an operation control example of the imaging apparatus 20 by the information processing apparatus 10 according to the present embodiment will be described with reference to FIGS. 4 to 12. The information processing apparatus 10 according to the present embodiment is capable of a single connection for establishing a communication connection to a single imaging apparatus 20 to remotely control the operation of the single imaging apparatus 20, and multi-connections for making communication connections to a plurality of imaging apparatuses 20 to remotely control the operations of the plurality of imaging apparatuses 20. As an example, an operation control example will be described here in which the multi-connections to a plurality of imaging apparatuses 20 are made.

<3-1. Multi-Connections: Batch Power ON/OFF Operation>

Figure 4:
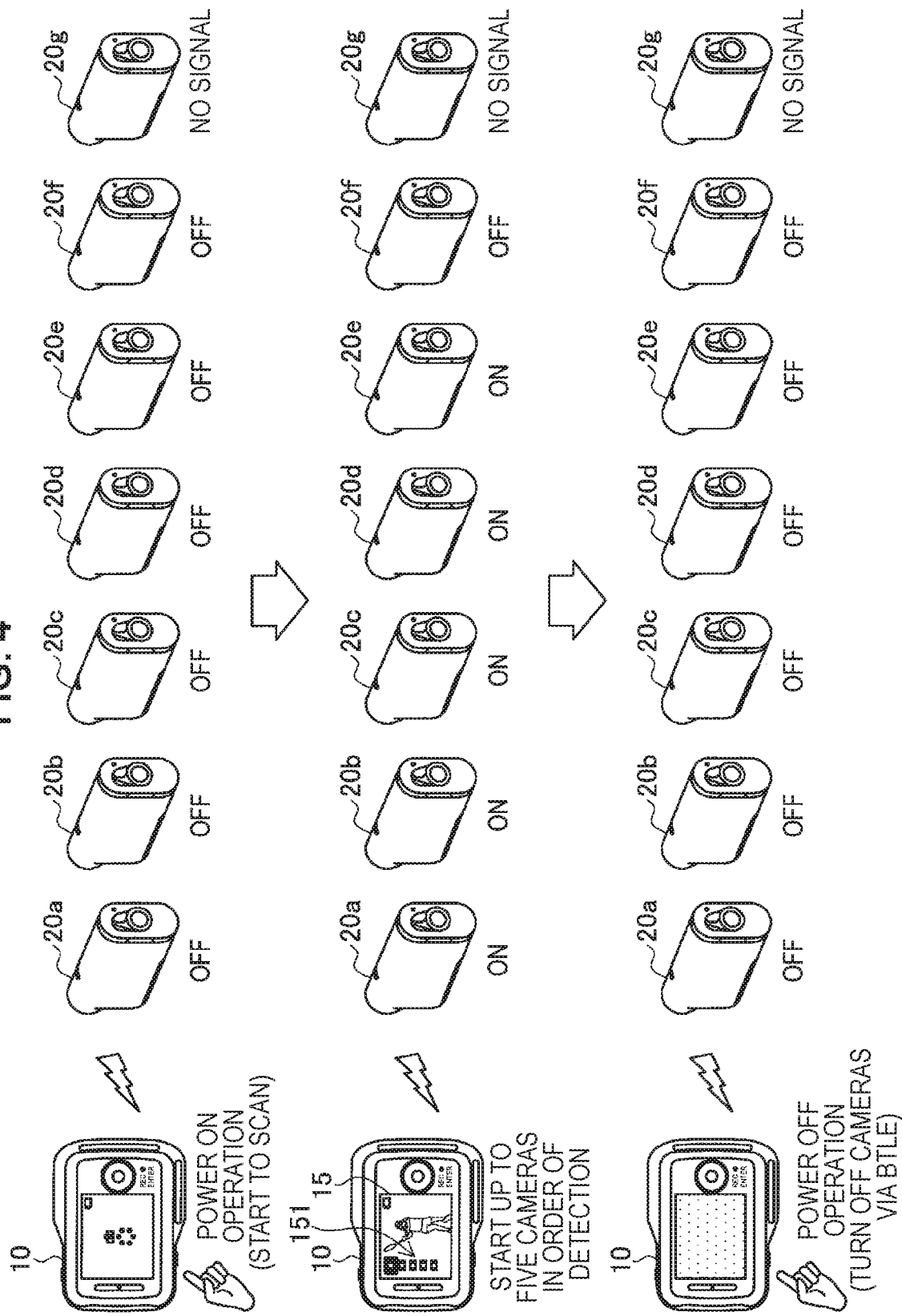
FIG. 4 is a diagram for describing batch power ON/OFF operation control according to the present embodiment when multi-connections are made.

FIG. 4 is a diagram for describing batch power ON/OFF operation control according to the present embodiment when multi-connections are made. As illustrated in the upper part of FIG. 4, when a user performs a power ON operation (e.g., pushes down the power ON/OFF button) on the information processing apparatus 10, the information processing apparatus 10 is powered on, and starts to scan a nearby imaging apparatus 20 through BT communication. The information processing apparatus 10 scans an imaging apparatus 20, for example, by receiving an advertising packet transmitted from the imaging apparatus 20 through BT communication. FIG. 4 illustrates that imaging apparatuses 20*a* to 20*f* are "OFF," but specifically in the standby states. The imaging apparatuses 20*a* to 20*f* at least transmit advertising packets through BT communication, and the advertising packets are received on the information processing apparatus 10 side. The imaging apparatus 20*g* has no signal, and an advertising packet from the imaging apparatus 20*g* is not thus received by the information processing apparatus 10.

Next, as illustrated in the middle of FIG. 4, the information processing apparatus 10 transmits power ON request data to a predetermined number of apparatuses, for example, the five imaging apparatuses 20*a* to 20*e* in the order of detection, and starts the five imaging apparatuses 20*a* to 20*e*.

The information processing apparatus 10 side may set, in advance, how many apparatuses are connectable at the time of multi-connections. In addition, it is also assumed that the information processing apparatus 10 determines whether or not multi-connections are possible, for example, on the basis of data received from the imaging apparatus 20. In addition, the information processing apparatus 10 may determine whether or not the imaging apparatus 20 is a terminal paired with the information processing apparatus 10, on the basis of data received from the imaging apparatus 20, and, if pairing has been performed, the information processing apparatus 10 may count the imaging apparatus 20 as a multi-connection target terminal.

The started imaging apparatuses 20a to 20e continuously transmit through images to the information processing apparatus 10. The through images are displayed on the display unit 15 of the information processing apparatus 10. In addition, an icon 151 corresponding to each of the connected imaging apparatuses 20a to 20e is displayed on the display unit 15. A user is able to switch the through images displayed on the display unit 15 by selecting the icon 151.

In this way, a user simply performs a power ON operation on the information processing apparatus 10, thereby automatically making multi-connections to nearby imaging apparatuses 20 paired with the information processing apparatus 10. Further, power ON control and camera start control are performed over the imaging apparatuses 20, and through images acquired from the imaging apparatuses 20 are displayed on the display unit 15 of the information processing apparatus 10.

Next, as illustrated in the lower part of FIG. 4, when a user performs a power OFF operation (e.g., pushes down a power OFF/OFF button), the information processing apparatus 10 transmits power OFF request data to the plurality of imaging apparatuses 20a to 20e through BT communication (more specifically, for example, BTLE communication), and performs control such that the imaging apparatuses 20a to 20e are powered off (the above-described standby states).

In this way, a user simply performs a power OFF operation on the information processing apparatus 10, thereby automatically performing power OFF control over the plurality of connected imaging apparatuses 20a to 20e.

<3-2. Multi-Connections: Batch Power ON/REC Operation>

Figure 5:
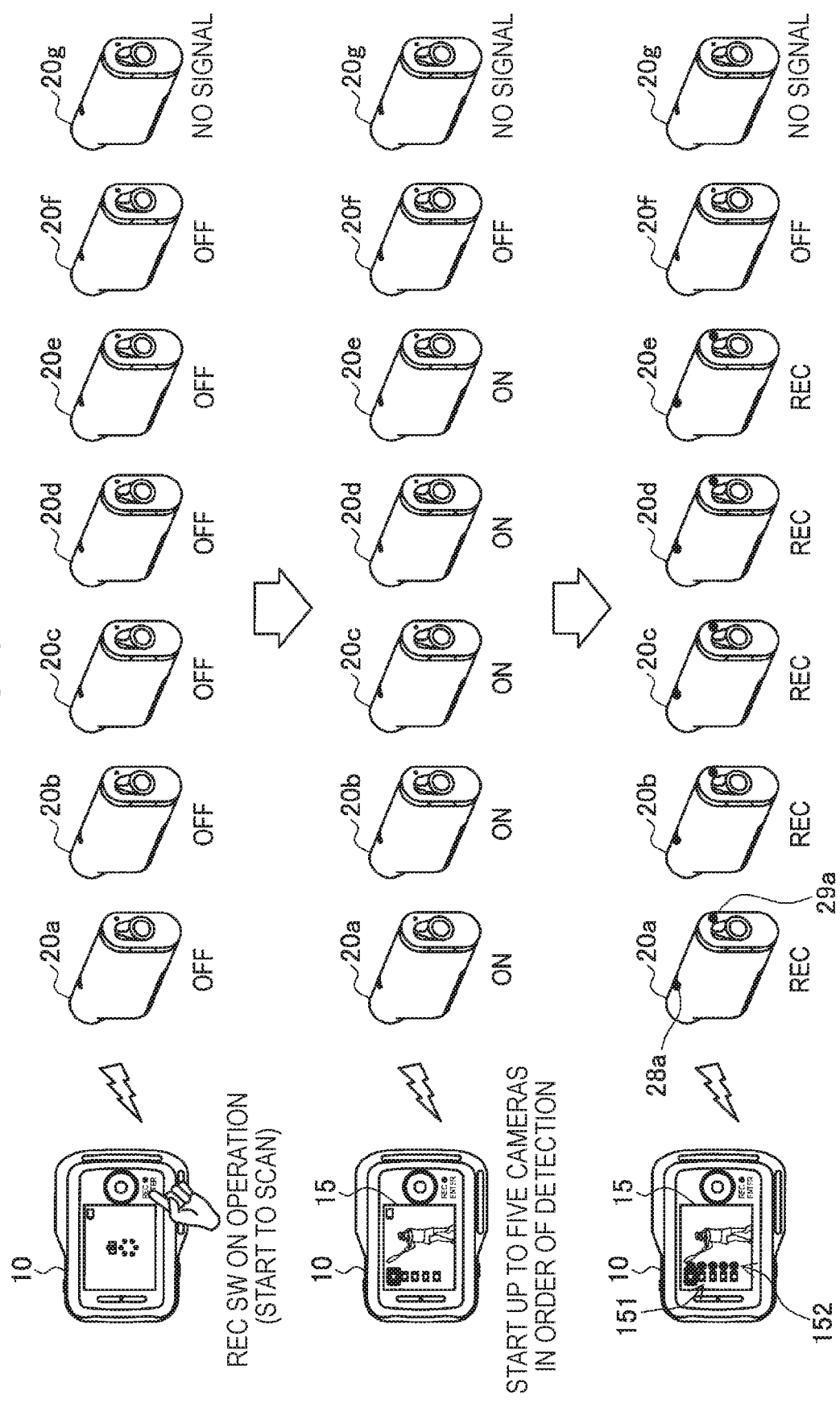
FIG. 5 is a diagram for describing batch power ON/REC operation control according to the present embodiment when multi-connections are made.

FIG. 5 is a diagram for describing batch power ON/REC operation control according to the present embodiment when multi-connections are made. As illustrated in the upper part of FIG. 5, when a user performs a power ON operation on the information processing apparatus 10, the information processing apparatus 10 is powered on, and starts to scan a nearby imaging apparatus 20 through BT communication.

Next, as illustrated in the middle of FIG. 5, the information processing apparatus 10 transmits power ON request data to a predetermined number of apparatuses, for example, the five imaging apparatuses 20a to 20e in the order of detection, and starts the five imaging apparatuses 20a to 20e. The started imaging apparatuses 20a to 20e continuously transmit through images to the information processing apparatus 10. The through images are displayed on the display unit 15 of the information processing apparatus 10.

Next, as illustrated in the lower part of FIG. 5, the information processing apparatus 10 transmits recording start request data to the plurality of imaging apparatuses 20a to 20e to which communication connections have been established. The imaging apparatuses 20a to 20e start recording under the control of the information processing apparatus 10. At this time, for example, REC lamps 28a and 29a provided to the imaging apparatuses 20 are turned on. In addition, an icon 151 corresponding to each of the plurality of imaging apparatuses 20a to 20e to which multi-connections are made, and an icon 152 indicating that each of the imaging apparatuses 20a to 20e is in the REC state are displayed on the display unit 15 of the information processing apparatus 10 along with a through image.

In this way, a user simply performs a power ON operation on the information processing apparatus 10, thereby allowing the information processing apparatus 10 to automatically make multi-connections to the nearby imaging apparatuses 20 paired with the information processing apparatus 10, start a camera, and further cause the imaging apparatuses 20 to start recording.

<3-3. Multi-Connection: Information Processing Apparatus 10 Side Power OFF Operation During REC>

Figure 6:
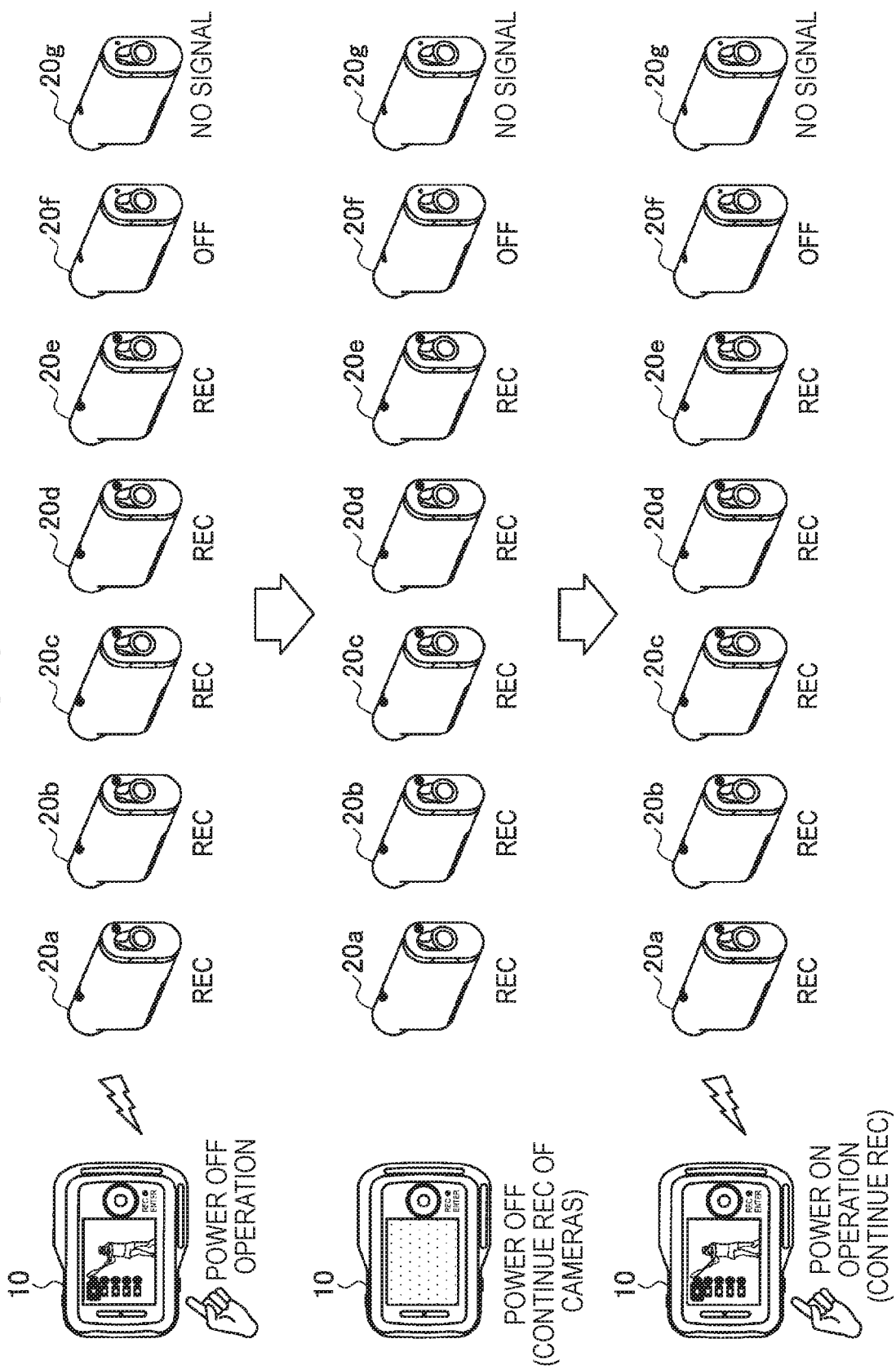
FIG. 6 is a diagram for describing a case where a power OFF operation is performed on an information processing apparatus side during REC of a plurality of imaging apparatuses to which multi-connections have been made.

FIG. 6 is a diagram for describing a case where a power OFF operation is performed on the information processing apparatus 10 side during REC of the plurality of imaging apparatuses 20 to which multi-connections have been made. In the present embodiment, as illustrated in the upper part of FIG. 6, when a power OFF operation is performed on the information processing apparatus 10 side during REC of the plurality of imaging apparatuses 20a to 20e connected to the information processing apparatus 10, the power source information processing apparatus 10 enters the OFF state, but the REC operations of the imaging apparatuses 20a to 20e continue as illustrated in the middle of FIG. 6. The imaging apparatuses 20a to 20e may be notified, for example, through BTLE that the information processing apparatus 10 is powered off, but the REC operations of the imaging apparatuses 20a to 20e continue.

Next, as illustrated in the lower part of FIG. 6, when a power ON operation is performed on the information processing apparatus 10 side, and the power source of the information processing apparatus 10 enters the ON state, communication connections are made again to the imaging apparatuses 20a to 20e, and through images acquired by the imaging apparatuses 20a to 20e are displayed. In the imaging apparatuses 20a to 20e, the REC operations continue.

<3-4. Multi-Connections: REC Stop and Power OFF Operation>

Figure 7:
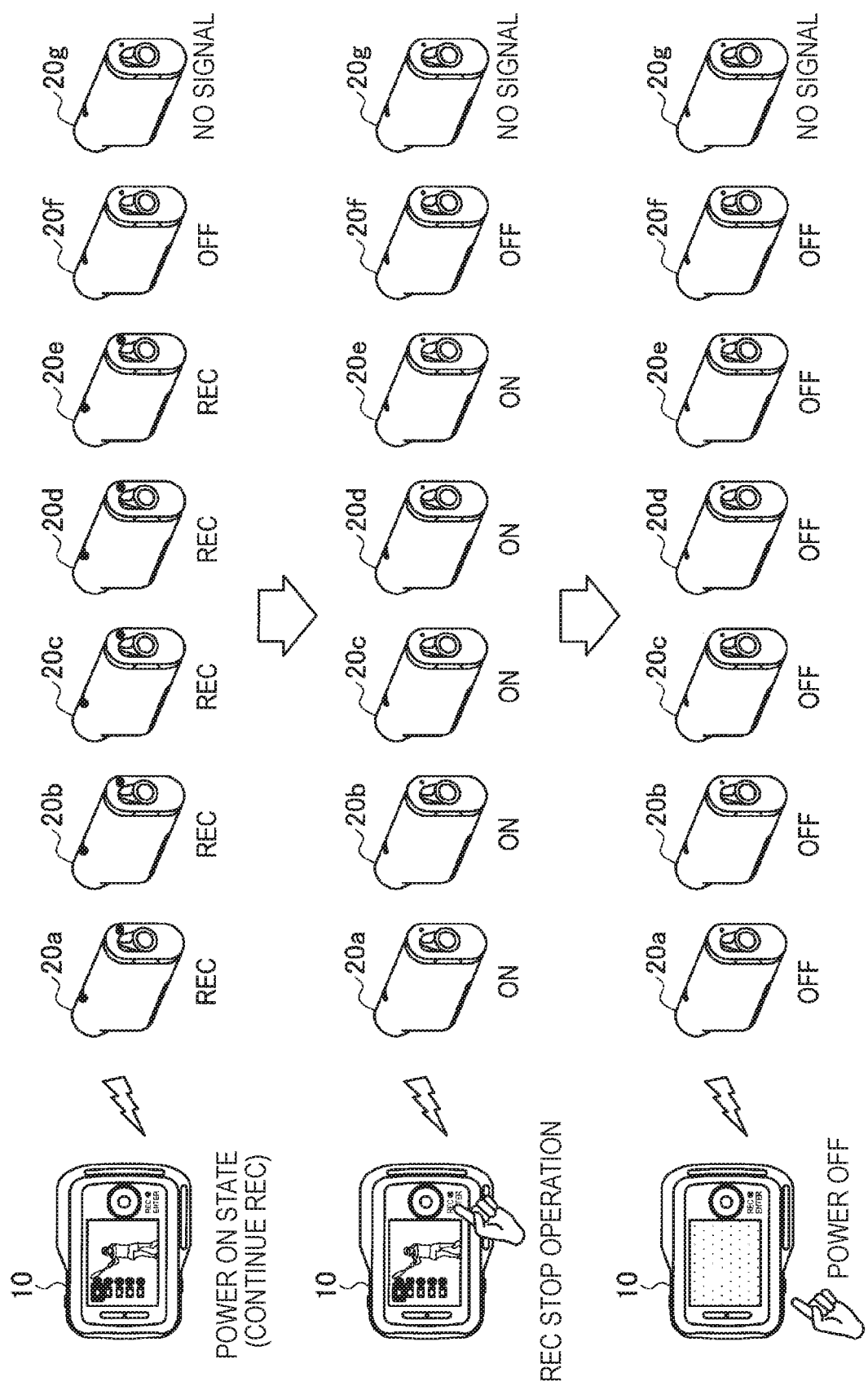
FIG. 7 is a diagram for describing an REC stop and power OFF operation on the plurality of imaging apparatuses to which multi-connections have been made.

FIG. 7 is a diagram for describing an REC stop and power OFF operation on the plurality of imaging apparatuses 20 to which multi-connections have been made. As illustrated in the upper part of FIG. 7, when a user performs an REC stop operation (pushes down the REC stop button) on the information processing apparatus 10 as illustrated in the middle of FIG. 7 in the case where the information processing apparatus 10 is in the power ON state, makes communication connections to the imaging apparatuses 20a to 20e, and the REC operations are performed in the imaging apparatuses 20a to 20e, the information processing apparatus 10 transmits recording stop request data to the imaging apparatuses 20a to 20e, and performs REC stop control.

Next, as illustrated in the lower part of FIG. 7, when a user performs a power OFF operation (pushes down the power ON/OFF button) on the information processing apparatus 10, the information processing apparatus 10 transmits power OFF request data to the imaging apparatuses 20a to 20e, performs power OFF control over the imaging apparatuses 20a to 20e, and turns off the power source of the information processing apparatus 10.

<3-5. Multi-Connection: Imaging Apparatus 20 Side Power OFF Operation During Communication Connection>

Next, a problematic point in the case where a power OFF operation is performed on at least one imaging apparatus 20 during multi-connections, and operation control according to the present embodiment will be described with reference to FIGS. 8 to 12.

Comparative Example

Figure 8:
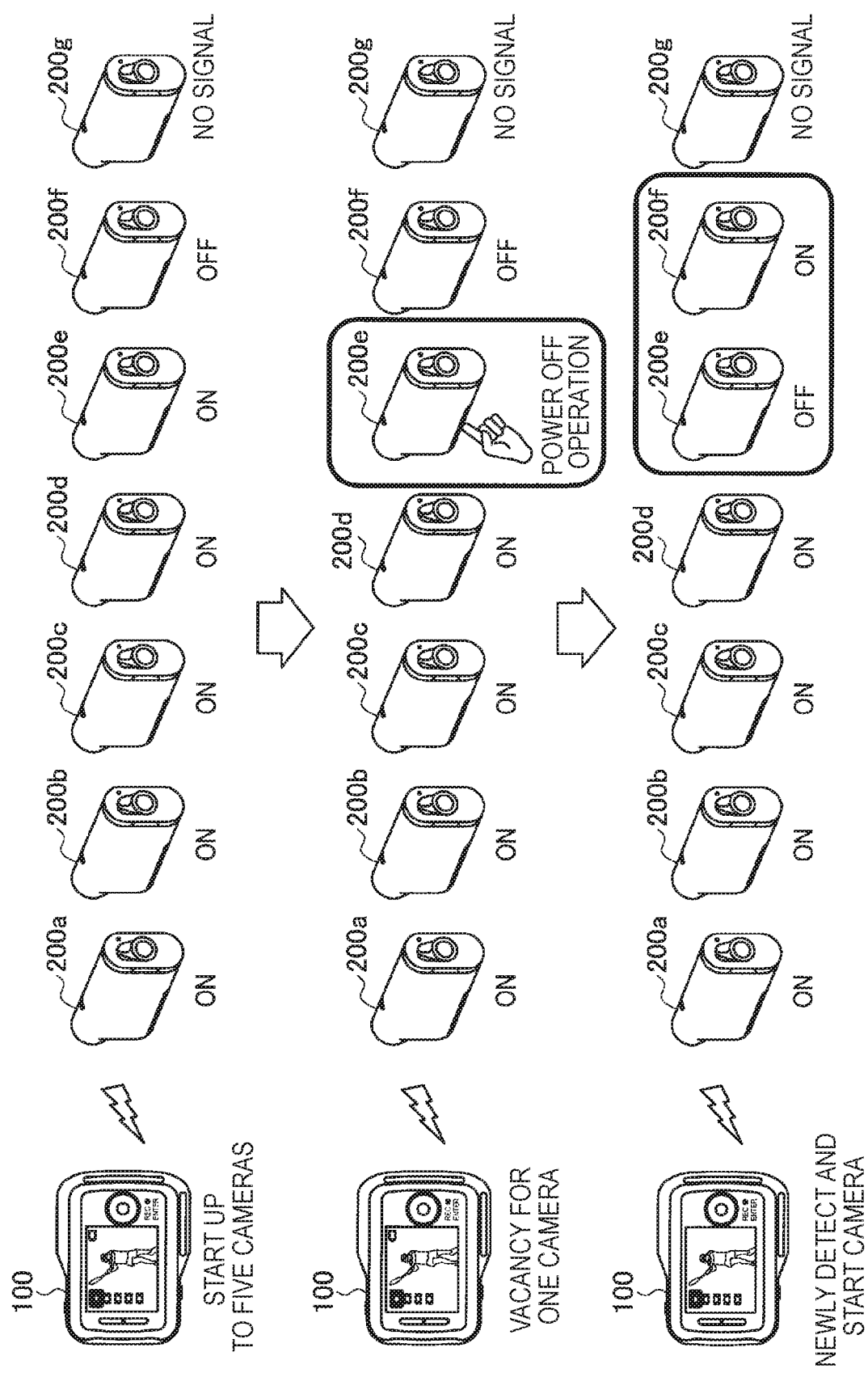
FIG. 8 is a diagram for describing an imaging apparatus side power OFF operation according to a comparative example when multi-connections are made.

FIG. 8 is a diagram for describing an imaging apparatus 200 side power OFF operation according to a comparative example at the time of multi-connections. As illustrated in the upper part of FIG. 8, an information processing apparatus 100 according to the comparative example makes communication connections to a plurality of imaging apparatuses 200a to 200e, performs power ON control, and starts the cameras. Here, it is assumed that the information processing apparatus 100 is set to be capable of making multi-connections to a predetermined number of cameras (a user is able to set), for example, up to five cameras. In this case, the information processing apparatus 100 detects nearby imaging apparatuses 200 in accordance with a power ON operation on the information processing apparatus 100, establishes communication connections to up to five imaging apparatuses 200 in order of detection, performs power ON control, and starts the cameras.

Next, for example, in the case where a user performs a power OFF operation (pushes down the power source switch) on the imaging apparatus 200e to power off the imaging apparatus 200e, the communication between the information processing apparatus 100 and the imaging apparatus 200e is disconnected.

When the communication connection to the imaging apparatus 200e is broken, the information processing apparatus 100 understands that there is a vacancy for one apparatus in the state in which the information processing apparatus 100 is capable of making multi-connections to up to five apparatuses, and detects an imaging apparatus 200 again. Specifically, for example, when the information processing apparatus 100 is in the standby state (waiting for an instruction to power on), and discovers an imaging apparatus 200f paired with the information processing apparatus 100, the information processing apparatus 100 automatically makes a communication connection, performs power ON control, and starts the camera.

In this way, for example, the imaging apparatus 200e that is powered off enters the standby state (waiting for an instruction to power on). Accordingly, the case is possible where the imaging apparatus 200e is detected again by the information processing apparatus 100, and power ON control is performed thereon. In addition, even if the power source of the imaging apparatus 200e is turned off when a user wishes to decrease the number of connected apparatuses, the occasion occurs in which the other imaging apparatus 200f is automatically discovered, power ON control is performed thereon, and it is impossible to decrease the number of connected apparatuses from the maximum number of multi-connectable apparatuses (here, five apparatuses as an example).

Then, in the present embodiment, it is possible to prevent, in the case where the power source of an imaging apparatus is turned off, a communication connection from being made to an imaging apparatus again against a user's will, and improve the convenience of the communication connection between an information processing apparatus and an imaging apparatus. The specific description will be made below with reference to FIGS. 9 to 11.

(State Transition According to the Present Embodiment)

Figure 9:
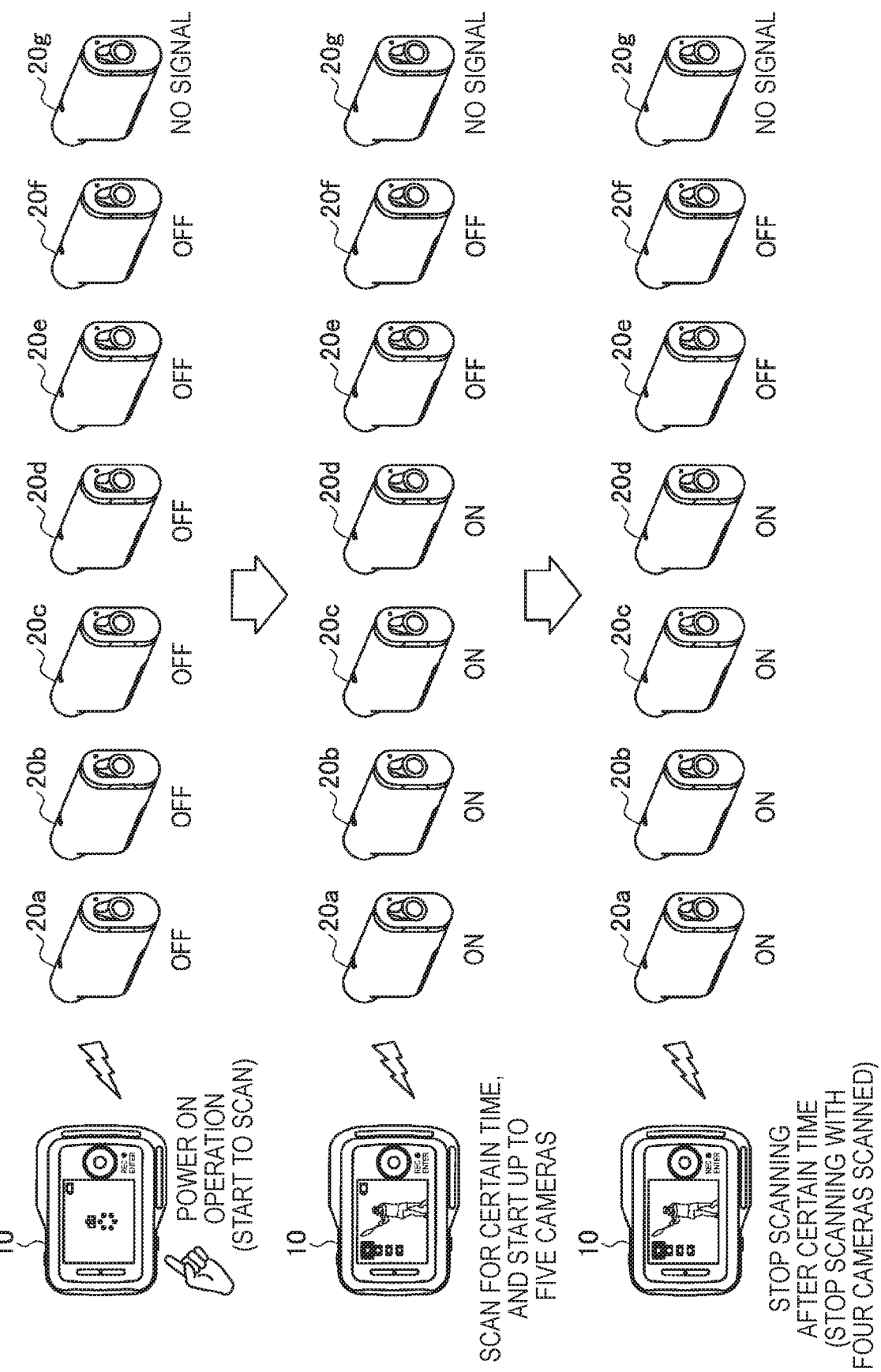
FIG. 9 is a diagram illustrating state transitions of the information processing apparatus and the imaging apparatus according to the present embodiment under communication connection control.
Figure 10:
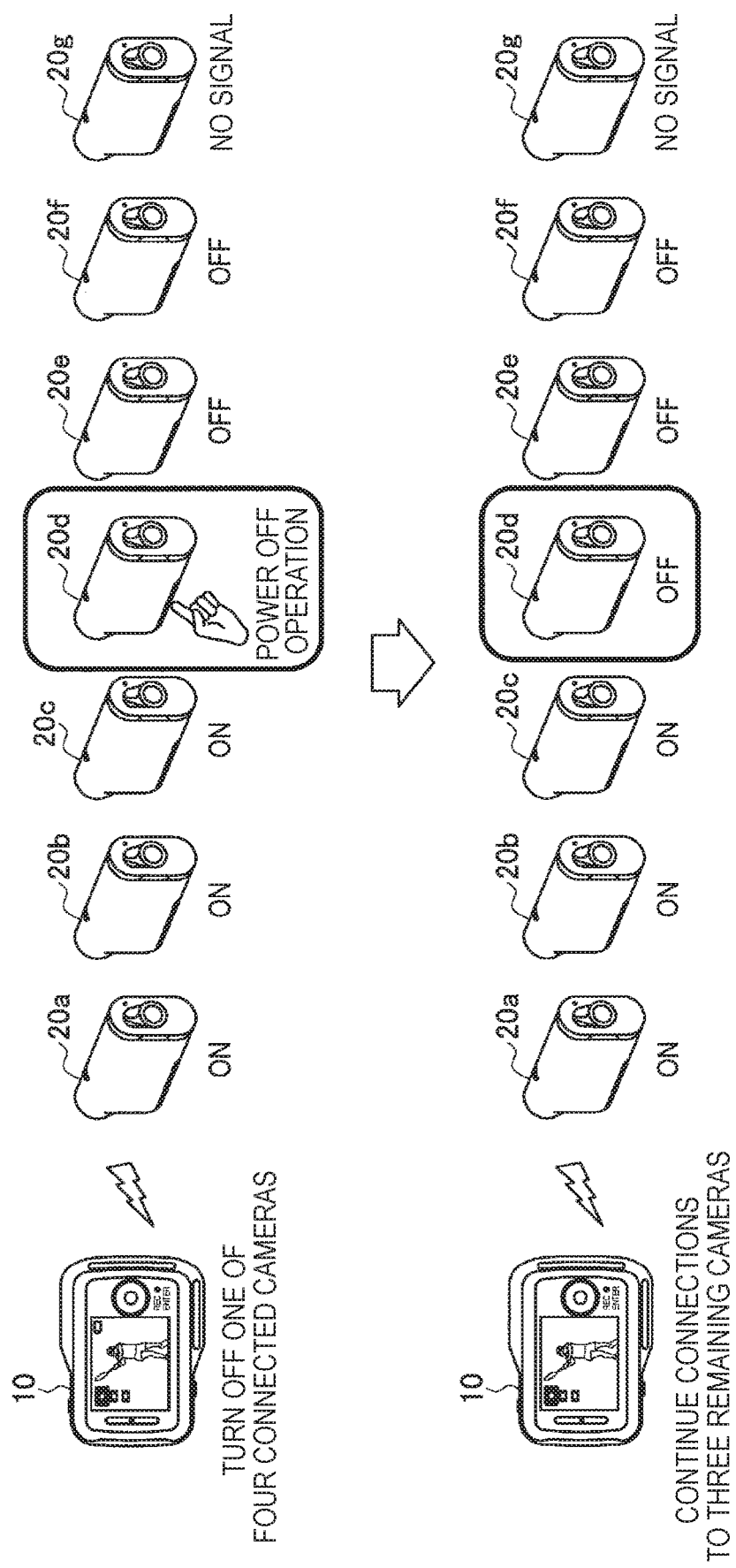
FIG. 10 is a diagram illustrating state transitions of the information processing apparatus and the imaging apparatus according to the present embodiment under communication connection control.

FIGS. 9 and 10 are diagrams for each describing state transitions of the information processing apparatus and the imaging apparatus according to the present embodiment under communication connection control. As illustrated in the upper part of FIG. 9, when a user performs a power ON operation on the information processing apparatus 10, the information processing apparatus 10 starts scanning to detect a nearby imaging apparatus 20.

Next, as illustrated in the middle of FIG. 9, the information processing apparatus 10 performs scanning (i.e., detection processing for the imaging apparatus 20) for a certain time. Once the information processing apparatus 10 discovers the imaging apparatuses 20a to 20d paired with the information processing apparatus 10 until the maximum number of multi-connectable apparatuses (here, five apparatuses as an example) is reached, the information processing apparatus 10 makes communication connections one by one, and performs power ON control and camera start control. Note that it is assumed in FIG. 9 that the imaging apparatuses 20e and 20f are not paired external apparatuses, or an imaging apparatus 20g has no signal. Therefore, the maximum number of connectable apparatuses is five for the information processing apparatus 10, but the information processing apparatus 10 is connected to up to four imaging apparatuses 20a to 20d alone.

Then, the information processing apparatus 10 according to the present embodiment performs control such that, as illustrated in the lower part of FIG. 9, scanning is stopped after a certain time elapses from the start of scanning in response to a power ON operation. Here, a start time point for scanning which serves as a criterion for the certain time may be timing at which a signal for a power ON operation is generated, or timing at which the wireless communication unit (e.g., first communication unit 22) starts to receive a packet. At this time, even in the case the number of connected imaging apparatuses 20 does not reach the maximum number of multi-connectable apparatuses, the information processing apparatus 10 stops scanning in the state in which the maximum number of apparatuses is not reached. For example, even in the state in which only four apparatuses are connected as illustrated in FIG. 9 in the case where up to five apparatuses are connectable, scanning is stopped in the state in which the four apparatuses are connected. With this arrangement, for example, as illustrated in the upper part of FIG. 10, even in the case where the connected imaging apparatus 20d is powered off according to a user operation, the information processing apparatus 10 does not perform scanning, but scanning remains stopped. Accordingly, as illustrated in the lower part of FIG. 10, the power source state of the imaging apparatus 20d continues off. In addition, no other imaging apparatus 20 is newly connected. Three imaging apparatuses 20 are connected to the information processing apparatus 10.

In this way, in the present embodiment, for example, scanning for an imaging apparatus 20 within the certain time makes it possible to prevent a communication connection from being made to an imaging apparatus against a user's will. The operation processing according to the present embodiment will be described in detail with reference to FIG. 11.

(Detailed Operation Processing According to the Present Embodiment)

Figure 11:
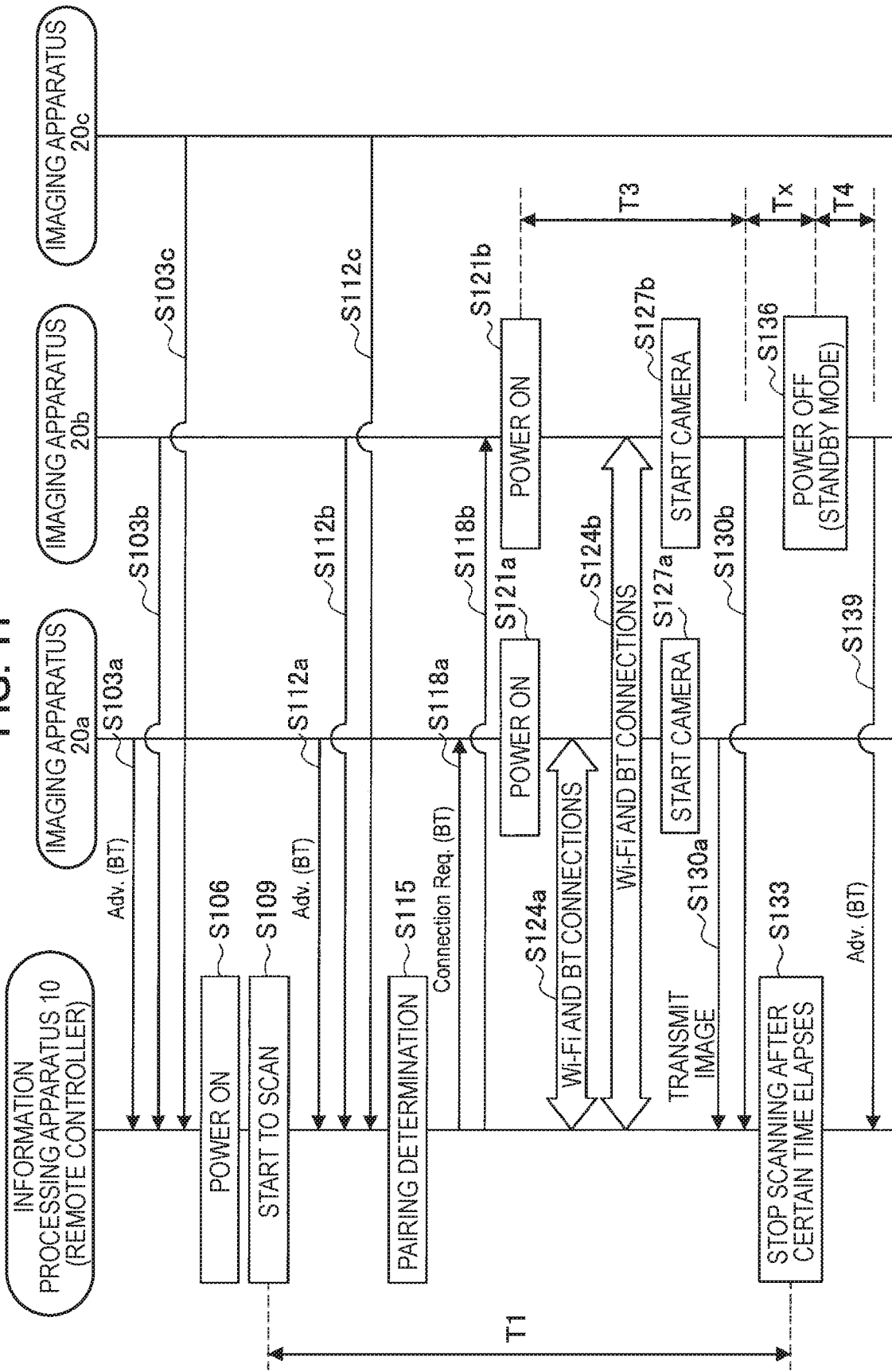
FIG. 11 is a sequence diagram illustrating operation processing of the information processing apparatus and the imaging apparatus according to the present embodiment.

FIG. 11 is a sequence diagram illustrating operation processing of the information processing apparatus 10 and the imaging apparatus 20 according to the present embodiment. In the example illustrated in FIG. 11, the plurality of imaging apparatuses 20a to 20c are used as an example.

As illustrated in FIG. 11, the respective imaging apparatuses 20a to 20c first repeat sending each advertising packet (sending each beacon) through BT communication (steps S103a, S103b, and S103c). Advertising packets can be sent, for example, at an interval of 37.5 msec.

Next, when a user performs a power ON operation (pushes down the power source switch) to power on the information processing apparatus 10 (step S106), the information processing apparatus 10 starts to scan a nearby imaging apparatus 20 (step S109).

Specifically, the information processing apparatus 10 receives advertising packets repeatedly sent from each of the imaging apparatuses 20a to 20c (steps S112a, S112b, and S112c), and makes a pairing determination with the information processing apparatus 10 (step S115). The pairing determination is a determination regarding whether or not an imaging apparatus is an imaging apparatus 20 that is authenticated (authenticated and registered) by the information processing apparatus 10 in advance. For example, the information processing apparatus 10 determines whether or not the imaging apparatus 20 has been authenticated, on the basis of the identifier of the imaging apparatus 20, for example, the Bluetooth device address included in the advertising packets sent from the imaging apparatus 20.

Next, the information processing apparatus 10 transmits connection requests through BT communication to the imaging apparatuses 20a and 20b determined to have been paired with the information processing apparatus 10 as a result of the pairing determination (steps S118a and S118b). More specifically, the information processing apparatus 10 requests Wi-Fi connection mode information and power source state information of the imaging apparatus 20 determined to be paired from the imaging apparatus 20, checks the power source state, the Wi-Fi connection mode (single mode/multi-mode), and the like of the imaging apparatus 20 on the basis of the received information to make a condition determination, and transmits a connection request to the imaging apparatus 20 that satisfies the condition. For example, in the case where the power source state of the imaging apparatus 20b is a standby state (waiting for an instruction to power on), the Wi-Fi connection mode is a multi-mode, and there is a vacancy in the maximum number of connections of the information processing apparatus 10, the information processing apparatus 10 transmits a connection request to the imaging apparatus 20b. Here, the single mode and the multi-mode of the Wi-Fi connection mode will be described. In the case of the single mode, the imaging apparatus 20 functions as an access point (master device), and the information processing apparatus 10 functions as a station (slave device). The imaging apparatus 20 makes a one-to-one connection to the information processing apparatus 10. In addition, in the case of the multi-mode, the imaging apparatus 20 functions as a station (slave device), and the information processing apparatus 10 functions as an access point (master device). The imaging apparatus 20 makes a many-to-one connection to the information processing apparatus 10.

Next, the power sources of the imaging apparatuses 20a and 20b are turned on in accordance with the connection requests transmitted from the information processing apparatus 10 (steps S121a and S121b), and the imaging apparatuses 20a and 20b each make a Wi-Fi connection to the information processing apparatus 10 (steps S124a and S124b). At this time, the imaging apparatuses 20a and 20b may connect the BT communication with the information processing apparatus 10 again. In addition, after the information processing apparatus 10 is powered on, it can take, for example, 700 msec to power on (start) the corresponding imaging apparatus 20.

Next, the imaging apparatuses 20a and 20b start the cameras (imaging units 27) (steps S127a and S127b), and transmit captured images acquired by the imaging units 27 to the information processing apparatus 10 as through images to start live views that display the through images on the display unit 15 of the information processing apparatus 10 in real time (steps S130a and S130b).

Wi-Fi and BT connections (step S124), camera starts (step S127), and live views (step S130) in the above-described imaging apparatuses 20 may be set to be automatically made in response to the imaging apparatuses 20 being powered on (started).

Then, after the certain time elapses from the start of scanning in response to a power ON operation, the information processing apparatus 10 stops scanning (step S133).

This turns off, for example, the power source of the imaging apparatus 20b, and causes the power source of the imaging apparatus 20b to enter the standby mode (step S136). It is possible to prevent, even if the transmission of advertising packets is resumed again (step S139), the imaging apparatus 20b that is powered off from being detected again and prevent power ON control from being automatically performed thereon. Here, the case where a user operates the power source switch of the imaging apparatus 20b to turn off the power source, and the case where APO (automatic power off) is activated on the imaging apparatus 20b side to turn off the power source are conceivable to power off the imaging apparatus 20b. The APO is a function that automatically powers off the imaging apparatus 20 in the case where the time for which no operation is performed on the imaging apparatus 20 reaches a predetermined time. The predetermined time may be, for example, 10 seconds or 60 seconds. The predetermined time may be set in advance or optionally set by a user. In addition, in the case where the APO function is set off by a user, the APO is not activated.

Here, an example of the definition of a certain time T1 will be described. As illustrated in FIG. 11, for example, the time (e.g., about 10 seconds) from the imaging apparatus 20 being powered on (step S121) to a through image being transmitted (step S130, live view start), and received and displayed by the information processing apparatus is represented as T3. The time (e.g., about 6 seconds) from the imaging apparatus 20 being powered off (transition to the standby mode) to the transmission start of an advertising packet is represented as T4. Then, in the case where T3+T4=T2 is defined, the certain time T1 is shorter than T2, and is taken to be, for example, 15 seconds (see the following expression).

$$T1 < T2$$

$$T2 = T3 + T4 \qquad \text{[Math. 1]}$$

In addition, in the case where the time for a user to take a look at the display screen of the imaging apparatus 20 or the information processing apparatus 10, and notice the unintended start of the imaging apparatus 20b is taken into consideration, for example, by setting the time from a through image being transmitted to the imaging apparatus 20 being powered off as a time Tx (see FIG. 11), it is possible to obtain the certain time T1 according to the following expression.

$$T1 < T3 + T4 + Tx \qquad \text{[Math. 2]}$$

In the above-described expression. Tx may be greater than or equal to 0 seconds and less than or equal to 75 seconds, or greater than or equal to 75 seconds. For example, the certain time T1 may be set as 90 seconds with Tx taken to be greater than or equal to 75 seconds. Note that, in the present specification, Tx corresponds to "Td" in the Claims. T1, T3, and T4 respectively correspond to "Ta," "b," and "Tc."

In this way, setting the scan time (T1) of the information processing apparatus 10 shorter than the time (T2) from the imaging apparatus 20 being powered on, and then powered off to transition to the standby mode to the imaging apparatus 20 sending advertising packets again makes it possible to prevent the information processing apparatus 10 from receiving the advertising packets resumed being transmitted and automatically performing power ON control again. Note that, when the power source of the information processing apparatus 10 is turned off, and the power source is turned on again to start the information processing apparatus 10, scanning shown in step S109 above is restored to resume detecting an imaging apparatus 20.

The above specifically describes the operational processing according to the present embodiment.

Application Example

Figure 12:
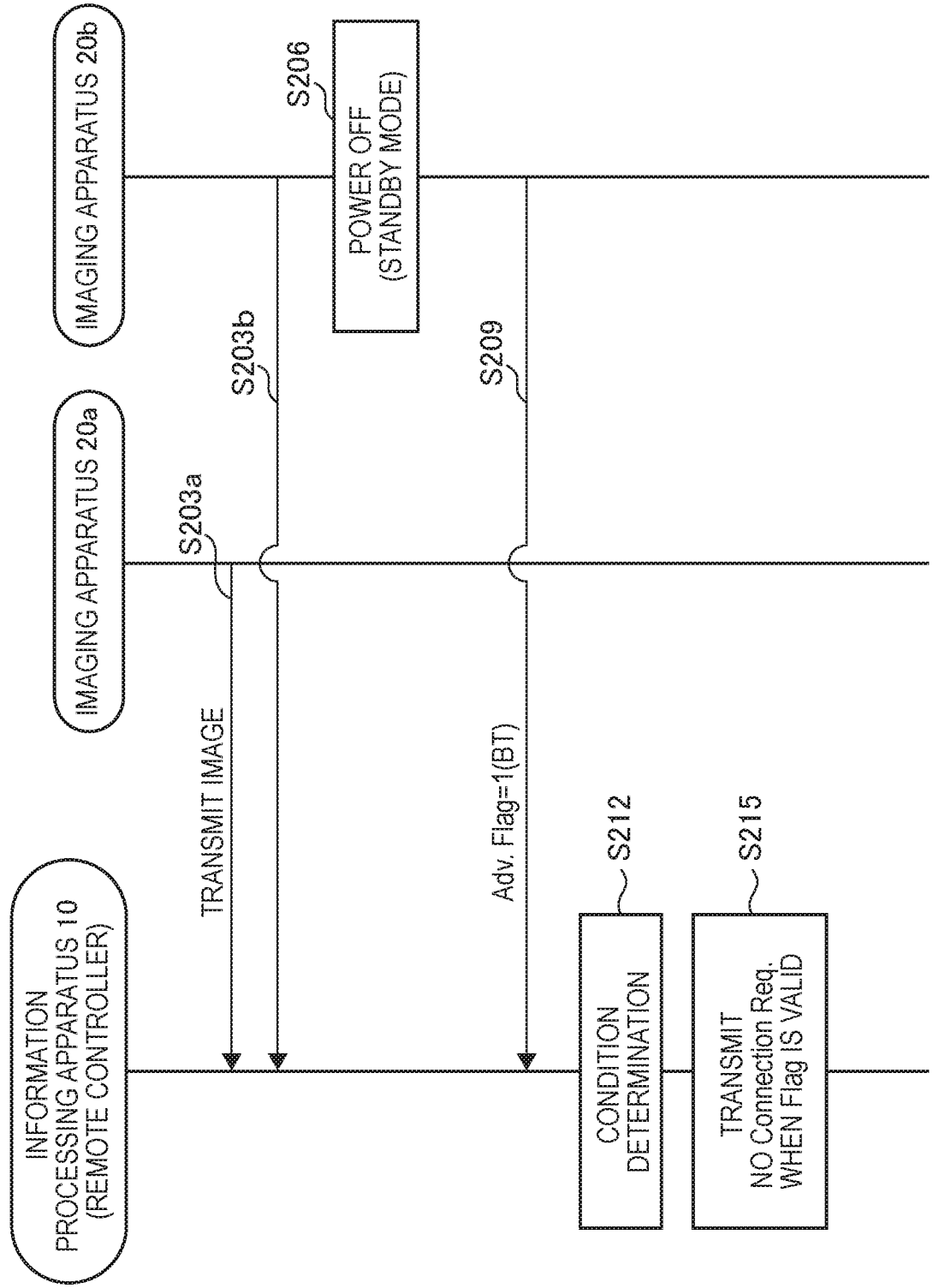
FIG. 12 is a sequence diagram illustrating operation processing according to an application example of the present embodiment.

The following describes operation processing according to an application example of the present embodiment with reference to FIG. 12. The method for preventing, in the case where the imaging apparatus 20 is turned off according to an operation on the imaging apparatus 20 side, the imaging apparatus 20 from being detected again according to the scanning of the information processing apparatus 10 is not limited to controlling the scan time as the certain time as described above. For example, the operation processing as illustrated in FIG. 12 can prevent it. The operation processing illustrated in FIG. 12 may be performed within the above-described certain time for scanning, or presuppose the case where scanning is always (or when there is a vacancy in the maximum number of connections) performed.

FIG. 12 is a sequence diagram illustrating the operation processing according to the application example of the present embodiment. As illustrated in FIG. 12, for example, the imaging apparatuses 20a and 20b first transmit respective through images to the information processing apparatus 10 to which communication connections have already been made, and offer live views (steps S203a and S203b).

Next, when the power source of the imaging apparatus 20b is turned off, the imaging apparatus 20b transitions to the standby mode (step S206). Similarly to the above-described embodiment, the case where a user operates the power source switch of the imaging apparatus 20b to turn off the imaging apparatus 20b, or the case where the activation of the APO causes the imaging apparatus 20b to be powered off is conceivable to power off the imaging apparatus 20b.

Next, the imaging apparatus 20b in the standby state sends advertising packets in the area around the imaging apparatus 20b through BT communication (step S209). At this time, the imaging apparatus 20b sets, in the advertising packets, information indicating that the imaging apparatus 20b is powered off on the basis of an operation on the imaging apparatus 20b side. It is possible to set this information, for example, as a flag. When Flag=1 holds, it is indicated that an operation on the imaging apparatus 20 side powers off the imaging apparatus 20. When Flag=0 holds, it is indicated that an operation other than an operation on the imaging apparatus 20 side powers off the imaging apparatus 20.

Meanwhile, scanning for an imaging apparatus 20 is continuously performed on the information processing apparatus 10 side. A condition determination for a communication connection is made on the basis of the identifier of the imaging apparatus 20 which is included in the advertising packets received from the imaging apparatus 20b (step S212). As the condition determination, the power source state and the Wi-Fi connection mode (single/multi) are checked as described in the above-described embodiment, and then it is also checked whether or not the information indicating that the imaging apparatus 20b is powered off on the basis of an operation on the imaging apparatus 20b side is valid.

Then, in the case where it is indicated that the imaging apparatus 20b is powered off on the basis of an operation on the imaging apparatus 20b side, the information processing apparatus 10 refrains from transmitting a connection request to the imaging apparatus 20b (step S215).

In this way, in the present application example, in the case where the imaging apparatus 20 is powered off in accordance with an operation on the apparatus side, and transitions to the standby mode, processing is performed to set, in advertising packets to be sent through BT communication, a flag indicating that the apparatus side is powered off. Then, in the case where the flag is valid in the advertising packets received by the information processing apparatus 10, the information processing apparatus 10 refrains from starting or detecting the imaging apparatus 20, thereby making it possible to prevent power ON control from being automatically performed again on the imaging apparatus 20 that is powered off. Note that, in the case where the power source of the information processing apparatus 10 is turned off, and started by being powered on again, control may be performed such that the valid flag in advertising packets is ignored, the imaging apparatus 20 is started and detected, and the valid flag is cleared.

Note that, in each of the above-described embodiments and the above-described application example, the case of operation control at the time of multi-connections is described, but operation control can be similarly performed at the time of a single connection.

4. CONCLUSION

As described above, the information processing apparatus 10 according to an embodiment of the present disclosure enables the convenience of the communication connection to an external apparatus (e.g., imaging apparatus 20) to be improved.

Specifically, the information processing apparatus 10 is capable of avoiding, when the information processing apparatus 10 detects one or more imaging apparatuses 20 around the information processing apparatus 10, automatically performs power ON control, and establishes communication connections, detecting again the imaging apparatuses 20 whose power sources are turned off according to user operations or the like after the communication connections are established, and automatically powering on the imaging apparatuses 20.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

It is also possible to create a computer program for causing the hardware, for example, the CPU, the ROM, the RAM, and the like built in the above-described information processing apparatus 10 and imaging apparatus 20 to perform the functions of the information processing apparatus 10 and the imaging apparatus 20. In addition, there is also provided a computer-readable storage medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control unit configured to detect an external apparatus in a wireless communication scheme, and perform control such that power ON request data is transmitted to the external apparatus in accordance with a detection result within a certain time from a detection processing start for the external apparatus, the power ON request data requesting the external apparatus to be powered on.

(2)

The information processing apparatus according to (1), in which the control unit determines on a basis of apparatus information of the detected external apparatus whether or not the external apparatus is an authenticated external apparatus, and performs control such that, in a case where the external apparatus is an authenticated external apparatus, the power ON request data is transmitted to the external apparatus.

(3)

The information processing apparatus according to (2), in which the identifier of the external apparatus is a device address of the external apparatus.

(4)

The information processing apparatus according to any one of (1) to (3), in which the control unit starts detection processing for the external apparatus in response to a power ON operation on the information processing apparatus.

(5)

The information processing apparatus according to any one of (1) to (4), in which the control unit performs establishment processing for communication with the external apparatus whose power source enters an ON state in another wireless communication scheme that is different from the wireless communication scheme.

(6)

The information processing apparatus according to (5), in which the control unit performs the detection processing for the external apparatus on a basis of an identifier of the external apparatus transmitted in a state in which the external apparatus does not perform wireless communication in the other wireless communication scheme, and transmits the identifier of the external apparatus at a predetermined interval in the wireless communication scheme.

(7)

The information processing apparatus according to (6), in which the certain time (Ta) satisfies an expression 1 below.

$$Ta < Tb + Tc + Td \quad \text{(expression 1)}$$

(In the expression 1 above, Tb represents a time from a power ON operation on the information processing apparatus to a start of predetermined processing between the information processing apparatus and the external apparatus via the other wireless communication, Tc represents a time from a power OFF operation on the external apparatus to a start of transmission of an identifier of the external apparatus at a predetermined interval in the wireless communication scheme, and Td represents a predetermined time.)

(8)

The information processing apparatus according to (7), in which

Td is greater than or equal to 0 seconds and less than or equal to 75 seconds.

(9)

The information processing apparatus according to (5), in which the control unit determines on a basis of wireless communication connection mode information of the external apparatus whether or not the external apparatus is set in a multi-mode, and performs control such that communication with a predetermined number of the external apparatuses in the other wireless communication scheme is established and maintained in a case where the external apparatus is set in the multi-mode.

(10)

The information processing apparatus according to (5) or (6), in which the wireless communication scheme is Bluetooth (registered trademark), and another wireless communication scheme that is different from the wireless communication scheme is Wi-Fi (registered trademark).

(11)

The information processing apparatus according to any one of (1) to (10), in which the control unit performs control on a basis of apparatus information of the detected external apparatus such that, in a case where a flag indicating that the external apparatus is powered off according to an operation on an apparatus side is valid, the power ON request data is not transmitted.

(12)

The information processing apparatus according to any one of (1) to (11), in which the external apparatus is an imaging apparatus, and the information processing apparatus functions as a remote controller that operates the imaging apparatus.

(13)

The information processing apparatus according to (12), further including:

a display unit configured to display a captured image in real time, the captured image being received from the imaging apparatus.

(14)

An information processing method including, by a processor:

detecting an external apparatus in a wireless communication scheme, and performing control such that power ON request data is transmitted to the external apparatus in accordance with a detection result within a certain time from a detection processing start for the external apparatus, the power ON request data requesting the external apparatus to be powered on.

(15)

A program for causing a computer to function as:

a control unit configured to detect an external apparatus in a wireless communication scheme, and perform control such that power ON request data is transmitted to the external apparatus in accordance with a detection result within a certain time from a detection processing start for the external apparatus, the power ON request data requesting the external apparatus to be powered on.

REFERENCE SIGNS LIST 10 information processing apparatus
11 control unit
12 first communication unit
13 second communication unit
14 operation unit
15 display unit
16 storage unit
20, 20a to 20g imaging apparatus
21 control unit
22 first communication unit
23 second communication unit
24 operation unit
25 display unit
26 storage unit
27 imaging unit

The invention claimed is:

1. An information processing apparatus comprising:
a control unit configured to
receive a power ON operation,
detect a first wireless transceiver of a first external apparatus in a wireless communication scheme in response to receiving the power ON operation,
transmit power ON request data to the first wireless transceiver in response to receiving the power ON operation and in response to detecting the first wireless transceiver within a certain time from a detection processing start, the power ON request data requesting the first external apparatus to change from a power OFF state to a power ON state,
detect a plurality of wireless transceivers of a plurality of external apparatuses in the wireless communication scheme in response to receiving the power ON operation, the plurality of wireless transceivers including the first wireless transceiver, and each of the plurality of external apparatuses including one or more of the plurality of wireless transceivers, and
transmit the power ON request data to some or all of the plurality of wireless transceivers in response to receiving the power ON operation and in response to detecting the plurality of wireless transceivers within the certain time from the detection processing start, the power ON request data requesting the some or all of the plurality of external apparatuses to change from the power OFF state to the power ON state,
wherein the plurality of external apparatuses are distinct from each other.

2. The information processing apparatus according to claim 1, wherein
the control unit is further configured to
determine whether the first external apparatus is an authenticated external apparatus based on an identifier of the external apparatus that is detected, and
transmit the power ON request data in response to determining that the first external apparatus is the authenticated external apparatus.

3. The information processing apparatus according to claim 2, wherein
the identifier of the first external apparatus is a device address of the first external apparatus.

4. The information processing apparatus according to claim 1, wherein the control unit is further configured to perform establishment processing for communication with the first external apparatus whose power source enters the power ON state in a second wireless communication scheme that is different from the wireless communication scheme.

5. The information processing apparatus according to claim 4, wherein
the control unit is further configured to
perform the detection processing on a basis of an identifier of the first external apparatus transmitted in a state in which the first external apparatus does not perform wireless communication in the second wireless communication scheme, and
transmit the identifier of the first external apparatus at a predetermined interval in the wireless communication scheme.

6. The information processing apparatus according to claim 4, wherein
the control unit is further configured to
determine whether the first external apparatus is set in a multi-mode based on a wireless communication connection mode information of the first external apparatus, and
establish communication with a predetermined number of external apparatuses in the second wireless communication scheme in response to determining that the first external apparatus is set in the multi-mode.

7. The information processing apparatus according to claim 4, wherein
the wireless communication scheme is Bluetooth (registered trademark), and
the second wireless communication scheme that is different from the wireless communication scheme is Wi-Fi (registered trademark).

8. The information processing apparatus according to claim 1, wherein
the control unit is further configured to
determine whether a flag in apparatus information associated with a detected external apparatus is valid, the flag indicating that the first external apparatus is powered off according to a power OFF operation on an apparatus side, and
not transmit the power ON request data in response to determining that the flag in the apparatus information of the detected external apparatus is valid.

9. The information processing apparatus according to claim 1, wherein
the first external apparatus is an imaging apparatus, and
the information processing apparatus functions as a remote controller that operates the imaging apparatus.

10. The information processing apparatus according to claim 9, further comprising:
a display unit configured to display a captured image in real time, the captured image being received from the imaging apparatus.

11. The information processing apparatus according to claim 1, wherein
receive the power ON operation further includes
receiving an input indicative of the power ON operation at the information processing apparatus, and
controlling the information processing apparatus to change from the power OFF state to the power ON state based on the input.

12. The information processing apparatus according to claim 1, further comprising:
a power ON/OFF button, wherein the power ON operation is received by the control unit when the power ON/OFF button is depressed and a power state of the control unit is changed from an OFF state to an ON state based on the depression of the power ON/OFF button.

13. An information processing apparatus comprising:
a control unit configured to
  receive a power ON operation,
  detect an external apparatus in a wireless communication scheme in response to receiving the power ON operation,
  transmit power ON request data to the external apparatus in response to receiving the power ON operation and in response to detecting the external apparatus within a certain time from a detection processing start, the power ON request data requesting the external apparatus to change from a power OFF state to a power ON state,
  perform establishment processing for communication with the external apparatus whose power source enters the power ON state in a second wireless communication scheme that is different from the wireless communication scheme,
  perform the detection processing on a basis of an identifier of the external apparatus transmitted in a state in which the external apparatus does not perform wireless communication in the second wireless communication scheme, and
  transmit the identifier of the external apparatus at a predetermined interval in the wireless communication scheme, wherein
a certain time Ta satisfies the following expression:

$Ta < Tb + Tc + Td$ wherein time Tb represents a time from the power ON operation on the information processing apparatus to a start of predetermined processing between the information processing apparatus and the external apparatus via the second wireless communication scheme,
wherein time Tc represents a time from a power OFF operation on the external apparatus to a start of transmission of the identifier of the external apparatus at the predetermined interval in the wireless communication scheme, and
wherein time Td represents a predetermined time.

14. The information processing apparatus according to claim 13, wherein
Td is greater than or equal to 0 seconds and less than or equal to 75 seconds.

15. An information processing method, the method comprising:
  receiving, with a control unit, a power ON operation;
  responsive to receiving the power ON operation, detecting, with the control unit, a plurality of wireless transceivers of a plurality of external apparatuses in a wireless communication scheme, each of the plurality of external apparatuses including one or more of the plurality of wireless transceivers; and
  responsive to receiving the power ON operation and detecting the plurality of external apparatuses in the wireless communication scheme, transmitting, with the control unit, power ON request data to some or all of the plurality of wireless transceivers within a certain time from a detection processing start, the power ON request data requesting the some or all of the plurality of external apparatuses to change from a power OFF state to a power ON state,
  wherein the plurality of external apparatuses are distinct from each other.

16. The information processing method according to claim 15, wherein
  receiving the power ON operation further includes receiving an input indicative of the power ON operation at the control unit and controlling the control unit to change from the power OFF state to the power ON state based on the input.

17. The information processing method according to claim 15, wherein
  receiving the power ON operation further includes changing a power state of the control unit from an OFF state to an ON state.

18. A non-transitory computer-readable medium comprising a program that, when executed by a computing device, causes the computing device to perform a set of operations comprising:
  receiving a power ON operation;
  responsive to receiving the power ON operation, detecting a plurality of wireless transceivers of a plurality of external apparatuses in a wireless communication scheme, each of the plurality of external apparatuses including one or more of the plurality of wireless transceivers; and
  responsive to receiving the power ON operation and detecting the plurality of external apparatuses in the wireless communication scheme, transmitting power ON request data to some or all of the plurality of wireless transceivers within a certain time from a detection processing start, the power ON request data requesting the some or all of the plurality of external apparatuses to change from a power OFF state to a power ON state,
  wherein the plurality of external apparatuses are distinct from each other.

19. The non-transitory computer-readable medium according to claim 18, wherein
  receiving the power ON operation further includes receiving an input indicative of the power ON operation at the computing device and controlling the computing device to change from the power OFF state to the power ON state based on the input.

* * * * *